3,784,490
MICROPOROUS VINYL CHLORIDE POLYMERS
AND METHOD OF MAKING THE SAME
Norman B. Rainer, Richmond, and Donald A. Full, Lexington, Va., assignors to Philip Morris Incorporated, New York, N.Y.
No Drawing. Filed Sept. 23, 1971, Ser. No. 183,256
Int. Cl. C08f 29/18, 47/08
U.S. Cl. 260—2.5 M                    16 Claims

ABSTRACT OF THE DISCLOSURE

This disclosure relates to a novel process and to novel products. The products comprise shaped structures of a vinyl chloride polymer having an improved microreticulated structure and are made by a process involving the formation of a dispersion of vinyl polymer particles in certain organic liquids which are non-solvents for the polymer, reduced pressure deaeration of the dispersion and heating of the deaerated dispersion to sinter the vinyl chloride polymer particles to form a microreticulated microporous structure. The products of this invention are particularly useful as filter materials and the process of the invention is especially suited for the formation of shaped porous articles, useful as filters.

---

It is known to prepare a polymer resin having a microporous microreticulated structure by sintering a mixture of a thermoplastic synthetic resin such as polyvinyl chloride, a plasticizer for the resin, for example dioctyl phthalate, and an organic liquid non-solvent for the resin, for example xylene, to a temperature at which the resin fuses while under a pressure sufficient to maintain the mixture in liquid phase until a microreticulated structure is formed and thereafter removing most of the non-solvent by reducing the pressure and heating. Such a product and process are described in U.S. Pat. Nos. 2,777,824 and 3,055,297 for use in printing operations. However, such products do not always have a desired degree of uniformity, are generally soft and rubbery and are not well adapted for use as filter materials.

Microporous microreticulated polymer may also be prepared, particularly for use as filters in cigarettes, by heating together a thermoplastic synthetic resin, such as polyvinyl chloride, and certain organic liquid non-solvent liquids for the resin to a temperature at which the resin fuses and under a pressure sufficient to maintain the non-solvent liquid in the liquid phase. The mixture may contain a plasticizer. The non-solvent, for example to Decalin or dodecane which appears to be preferred, and plasticizer, when employed, are removed or extracted after fusion by exposing the fused resin to vapors of a heated second liquid, such as lower alcohols or water. This product and process, disclosed in U.S. Pat. No. 3,528,433, granted Sept. 15, 1970 to W. R. Johnson, J. S. Osmalov and R. N. Thomson, provide a polymer product which is friable and capable of being readily broken or ground to small size while retaining its microreticulated porous structure and which is particularly suitable in comminuted or particulate form for cigarette filters.

The dispersion of thermoplastic resin and non-solvent, from which the above-mentioned microreticulated polymer is made, is somewhat heat sensitive and is affected by thermal gradients during the heating step, shrinkage and other factors which may result in some non-uniformity in the sintered product. This is not a serious problem when the product is to be crushed and/or employed in a powdery or granular form. However, when the intended use requires that the product be molded or formed into a desired and particular shape, these conditions are far less tolerable. Where plasticizers are present in the dispersion in addition to the non-solvent, the product is soft and flexible. Furthermore, the plasticizer tends to cause non-uniformity in the product, such as in the formation of an impermeable outer sheath. Such a product is not useful in many of the applications of the present invention unless the plasticizer is added after the fusion step and subsequently extracted by the use of a carefully chosen solvent.

We have discovered that a uniform and micro-reticulated microporous vinyl chloride polymer may be made which can be formed or molded into a shaped product possessing structural strength and uniformity suitable for various uses by the careful selection of an organic non-solvent to form a vinyl chloride polymer dispersion and by an improved process that includes a reduced pressure deaeration of the vinyl chloride polymer dispersion.

A shaped product as described here is intended to mean a molded product having a solid, essentially non-frangible relatively stable structure as distinguished from a loosely packed or compacted article made by merely compressing a mass of particulates or powdery material.

Accordingly, this invention relates to a novel process and novel products. The products comprise a vinyl chloride polymer having an improved microreticulated structure uniform throughout, the products being structurally resistant to deformation. They are made by a process involving the formation of a dispersion of vinyl chloride polymer particles in certain water-soluble of water-miscible organic liquids which are non-solvents for the polymer, reduced pressure deaeration of the dispersion and heating of the deaerated dispersion to sinter the vinyl chloride polymer particles to form a microreticulated microporous structure. The products of this invention are particularly useful as filter materials and the process of the invention is especially suited for the formation of shaped porous articles, useful as filters, for example as shaped porous liquid or gaseous filters.

A preferred aspect of the present invention involves the formation of a shaped vinyl chloride polymer product with good compression strength and resistance to deformation comprising a vinyl chloride resin having a microporous structure comprising interconnected aggregates of united vinyl chloride polymer particles, the aggregates defining a reticular capillary pore system extending from surface to surface of the structure and having an effective pore diameter of about 1 to about 30 microns.

According to the present invention, the process for preparing microreticulated microporous vinyl chloride polymer products, particularly shaped products, is carried out by starting with a finely divided vinyl chloride resin powder. The resin powder is obtained by the drying of a polyvinylchloride latex consisting of an aqueous dispersion of discrete spherical particles having a diameter generally below 1 micron. By virtue of the drying process, usually spray drying, a large percentage of the primary particles cluster together to form aggregates containing from 3 to 10 or more primary particles and having an overall size in the range of 0.5 to 3 microns.

The powder may also contain fillers, binding agents, or other substances which either enhance the manufacturing process or impart specialized functional characteristics to the product. The resin powder and such additional agents as mentioned is added to an organic, water-soluble non-solvent for the resin and a dispersion of vinyl chloride polymer particles and other particles if present is prepared with the non-solvent, the latter comprising a polyhydric alcohol of the formula $R(OH)_x$ where R is a multivalent alkyl or alkyl ether radical of 2–8 carbons and $x$ is 2, 3 or 4, which alcohol is water-soluble or water-miscible and has a boiling point greater than 160° C. at atmospheric pressure. Following the dispersion step, the dispersed material is then subjected to a deaeration step.

The deaeration of the dispersion prior to the first heating and sintering step is an important and critical feature of the invention. It has been found that in the preparation of the vinyl chloride resins used here the discrete polymer particles are generally of about ½ micron in size or less. However, when the resin preparations are dried to powdery form, usually by spray drying, they are drawn together forming agglomerates which entrap air and gas. These aggregates generally average about 2 microns in size or larger although aggregates as little as 1 micron in size will also have entrapped air or gas. Additionally, when the vinyl chloride dispersion in non-solvents of low wettability, high viscosity or high specific gravity is prepared, there is further air entrapment and further formation of agglomerates. If this air is not removed, it has been found that in subsequent heating and sintering a shaped product of satisfactory strength is difficult if not impossible to produce. Thus, in carrying out the deaeration of the dispersion, the latter is subjected to high vacuum conditions, utilizing a pressure below 10 mm. of mercury until bubbling of released air and gases substantially ceases and the next step of sintering may be carried out.

Products having high surface area and satisfactory average pore diameter are produced by the process of this invention under conditions which minimize the velocity of settling of the particles in the non-solvent liquid medium. The rate of fall of the particles is dependent in large measure upon Stokes Law. In the present case, where a vinyl chloride polymer is used involving either polyvinyl chloride or a copolymer of at least a major amount of vinyl chloride, the density of this material is in the neighborhood of about 1.40 g./cc. Taking this figure, the influence of the non-solvent liquid in controlling the settling rate of the vinyl chloride polymer may be expressed by the fraction:

$$\frac{1.40 - P_1}{M}$$

where $P_1$ is the density of the non-solvent and M represents its viscosity. Since the velocity of settling should advantageously be low, various liquids were subjected to calculations based on the formula given above and the results obtained are given in Table I. Also shown in the table are the data indicating the surface tension of the liquids.

TABLE I

| Non-solvent liquid | M (poises) | $P_1$ (g./cc.) | $1.40-P_1/M$ | Surface tension (dynes/cm.) |
| --- | --- | --- | --- | --- |
| Glycerine | 14.9 | 1.261 | $9.33 \times 10^{-3}$ | 63 |
| Propylene glycol | .56 | 1.036 | $6.50 \times 10^{-1}$ | 72 |
| Triethylene glycol | .36 | 1.125 | $7.6 \times 10^{-1}$ | 45 |
| Diethylene glycol | .30 | 1.118 | $9.4 \times 10^{-1}$ | 49 |
| Ethylene glycol | .209 | 1.113 | 1.373 | 48 |
| Decalin | .045 | 0.872 | 11.73 | 31 |
| Ethanol | .012 | 0.789 | 50.92 | 22 |

As the data of Table I demonstrate, satisfactory liquids such as glycerine, propylene glycol and ethylene glycol provide formula values below 2.0 (third column). Liquids such as Decalin and ethanol have values considerably above 2.0.

It has also been found that suitable non-solvent liquids for use in the practice of the present invention will have high surface tension. Preferred liquids will have surface tensions of greater than 40 dynes/cm. and preferably between 45 and 75. Surface tension values for the different liquids are shown in Table I.

The heating and sintering step is carried out on the deaerated dispersion while in a form or mold at a temperature at which the resin fuses, generally below 200° C. The shaped product is then treated to remove substantially all of non-solvent remaining in the formed structure.

The sintered, microporous polymer product may be subjected to post-sintering in accordance with one embodiment of the present invention, while being supported in a powder bed in order to alter the density of the structure and to reduce pore size. The sintered product also may be subjected to contact with a plasticizer or catalyzed monomer at elevated temperatures in order to effect either in situ softening or hardening of the structure, respectively. By this method of the present invention, difficulties encountered when plasticizers are present in attempts to alter the physical characteristics of the microporous structure, as described above, are avoided.

The uses, for which products of the present invention are suitable, include use of shaped articles formed by the present process as solid filters for removing particles from liquid media or for removing particulate matter from cigarette smoke, as wicks containing fluids such as inks within its pores, as gas diffusers, as metering barriers and even as acoustical absorbing structures. Furthermore, the shaped articles can be sterilized by careful heat treatment or preferably by sterilizing agents such as ethylene oxide, for use in bacteriological investigations, hospital applications, pharmacological preparations, and the like. They can replace the more breakable porous products with low impact strength and much more expensive and breakable ceramic porous structures, except when the latter are used for very high temperature applications. Because of their strength, they can be used where relatively high fluid pressures are to be employed.

The vinyl chloride resin employed in accordance with the present invention may be polyvinyl chloride or may be a vinyl chloride copolymer, prepared with up to 30% of a comonomer such as vinyl acetate, propylene, or alkyl esters of maleic acid, preferably lower alkyl esters. Terpolymers are also contemplated within the purview of useful polymers said terpolymers being prepared from three monomers, also contemplated are compatible blends, such as blends of polyvinyl chloride and polymers of esters of acrylic and methacrylic acids.

The polyvinyl chloride resin particles may constitute from 5 to 40% by weight of the dispersion, but preferably should constitute from about 10 to 30% by weight of the dispersion. In obtaining the resin powder, the primary particle sizes are generally below 1 micron in diameter and will range from as little as 0.3 to 1 micron in terms of discrete polymer particles and hard aggregates. However, a large percentage of the powder may be in the form of soft aggregate lumps having sizes ranging as high as 100 microns. In preparing the dispersion, the shearing or milling forces employed will break up the larger soft aggregate to smaller aggregates having an average particle size of from about 1 to 30 microns when dispersed in the non-solvent. This is the preferred range of sizes for the process of the invention.

The polyhydric alcohol non-solvents of the present invention have the desirable property of water miscibility or solubility as well as relatively low wettability and high viscosity. The non-solvents employed in accordance with the present invention include low molecular weight glycols and glycerine or mixtures thereof. Preferred nonsolvents are glycols of 2 to 6 carbon atoms such as ethylene glycol, 1,3-butanediol, 2-methyl-2,4 pentanediol, diethylene glycol, triethylene glycol and glycerine. Particularly preferred non-solvents are ethylene and propylene glycols. The non-solvents may be used either alone or in admixtures.

Describing the invention in greater detail, the vinyl chloride resin particles are dispersed in the non-solvent by conventional means, for example, by stirring, ball milling or by high shear mixing. Preferably, the dispersion is formed by ball milling for a period of 2 to 24 hours or high shear mixing for a period of 3 to 10 minutes. The dispersion is then deareated by subjecting it to a pressure below about 10 mm. of mercury, preferably below about 2 mm. of mercury until bubbling ceases. In this manner and as indicated previously, air on the particles or entrapped within agglomerates is removed. The deaerated disposersion may then be placed in a form or mold having a desired shape, and heated until sintering occurs.

The sintering time and temperatures are selected to prevent under or over sintering. Under sintering will result in articles of poor structural strength and over sintering will cause some loss in porosity and produce polymer degradation. Effective sintering is accomplished at a temperature of from 125° C. to about 190° C., preferably from about 150° C. to 170° C. for a period of from 5 to 80 minutes and preferably from 30 to 50 minutes. It should be understood that the lower temperatures will require the longer treatment time and vice versa. Additionally, very thin structures (e.g., 1–3 mm. thickness) can be sintered rapidly because less time is required for heat to penetrate. On the other hand, with more massive structures, it is preferred to employ lower temperatures and longer times.

The shaped product is then cooled and drained of non-solvent. Any remaining non-solvent is removed by extraction with or without heating. The extracting medium may be a volatile solvent to which the synthetic resin is impervious. Since the non-solvent is water-soluble or water miscible its removal from the shaped polymeric structure is easily accomplished with an aqueous extracting agent which is later volatilized off. After the extracting solvent has been removed by drying or heating, a porous structure substantially free of solvents is obtained in a shape useful as a filter thimble or cone, a disc, an open-ended tube, a cylinder and the like according to the mold used. Any variety of molds or forms may be used. One form of mold is a belt with retaining edges for deposit of a sheet product.

In general, filters according to the invention are designed with substantially parallel walls to effect uniformity of flow. The thickness of the filter walls may range from about 1 to 20 mm., with a preferred thickness not greater than about 10 mm., the latter being found to be sufficient to confer the needed strength to the filter for most uses.

In another embodiment of the present invention, the shaped microreticulated vinyl chloride resin product can be made more dense and of smaller pore diameter by means of a post-sintering treatment. This treatment also increases the rigidity of the already-formed structure. However, the post-sintering of the product may cause distortion, as well as excessive shrinkage unless the product is supported on or in a bed of finely divided solids such as fine sand, liquid mercury, high melting polymer powders, microspheres of glass or ceramic, or free-flowing clays. This bed should not be so firm that all shrinkage is prevented, otherwise cracking will result. In general, the support material should be a liquid-like medium capable of exerting substantially uniform pressure on all parts of the immersed structure undergoing treatment yet incapable of entering the pores of structure. A suitable supporting powder is "Cab-O-Sil" silica aerogel (a product of the Cabot Corporation). Products in the form of flat sheets or discs need only the support of a relatively flat surface whereas products of relatively round or complex shapes are preferably embedded in the supporting powder. Where post-sintering is performed, it is preferred to make certain that any liquid in the structure is extracted beforehand since liquid within the pores will restrict further sintering. Post-sintering heating is carried out at a temperature of from 60° to 170° C., preferably about 80° C. to 150° C. for about 1 to 60 minutes, preferably 2 to 30 minutes.

Because of the shrinkage which generally occurs in the original sintering stage, which may amount to about 25% in each dimension, the size of the mold must be chosen to allow for this change in dimensions. Shrinkage of at least 20% may be expected. Some further shrinkage in volume will occur if post-sintering is carried out, but the degree will vary with the severity of the treatment.

In accordance with the present invention, a porous structure may be obtained having a pore size of from about 1 to about 30 microns in average diameter depending on the size of the resin particles, the preparation of the dispersion and the heat treatment. Thus, the pore size of the finished product is determined partially by how much agglomeration there is among the polymer particles and/or by how well the agglomeration found in the commercial product is broken up prior to or during the dispersing in the non-solvent. Thus, ball milling the dispersion extensively will produce a finer pored product than the brief shearing action of a blender. The non-solvent will also determine to some degree the pore size. For example, when glycerine is used for dispersion of the resin powder, large size pores result. Consequently, ball milling of dispersions is necessary when one uses glycerine and a small pore size is desired.

The internal structure of the product of this invention consists of a random three-dimensional labyrinth network of interconnecting polymer material. The spaces between the polymer material constitute the "pores." Said pores are of non-round, irregular configuration, random in size and shape. Microscopic examination of cross sections of the product at 500× magnification reveals that, although pores are not uniform, a well defined average pore size exists for a given sample and can be directly measured.

The average pore size can also be determined by analysis of the product with a mercury intrusion porosimeter. A porosimeter of 0–15,000 p.s.i. range (American Instrument Co., Silver Spring, Md.) may be used in ascertaining the pore size distribution of the products of this invention. Such analysis provides a continuous graphical plot of pore volume vs. pore size, namely a representation of the amount of pore volume attributable to each pore size. The graphical analysis of the products of this invention consistently show a steeply ascending portion. The pore size corresponding to the midpoint of the steeply ascending portion of the pore volume/pore size curve may be taken as the average pore size for the sample. When this is done, it is found that more than 50% of the total pore volume of a sample resides in the pore sizes within 4 micron units of diameter from the average pore diameter. In some samples, particularly those produced from a carefully homogenized dispension, the pore size distribution has been found to be so narrow that 75% or more of the pore volume will be found in the region of ±4 micron units bracketing the average pore size.

Different practical filtration problems will require filters of different pore structures. In general a filter having a small average pore diameter will have greater physical strength than a filter of similar gross geometry but larger pore size. The greater strength is useful in withstanding the pressure gradient which always develops between the upstream and downstream surfaces of a filter. With sufficient physical strength, shaped filters of this invention can be used without additional physical reinforcement and will have a longer useful on-stream cycle because they can withstand the increase in pressure gradient across the filter which accompanies accumulation of filter cake on the surface. Such filters can readily be back-washed to remove accumulated filter cake, and can then be reused.

Filters of relatively large pore size will provide less resistance to flow through the filter and are useful where low flow impedance is necessary, or where little pressure is available to force the fluid stream (whether liquid or gas) through the filter. Although the larger pore size may diminish structural strength, such filters may be utilized in conjunction with suitable fluid-permeable supporting structures such as wire grids, grates or the like, which conform to the contour of the downstream surface of the filter. The strength of the filter may also be increased by design factors. For example, tubular or thimble structures can resist considerably greater pressure than flat or angular structures. Thicker walls will also increase strength. Any increase in flow resistance due to thicker wall structure might be compensated for by exposing a greater surface to the fluid being filtered.

In most industrial filtrations 100% efficiency of particulate removal is not essential for a single stage of filtration or even for the entire filtration operation. In such applications it has been found that the filters of this invention will perform effectively even when the average pore size is larger than the size of the particles to be removed from the fluid stream. Two factors explains this phenomenon: (a) the random pore size distribution includes some pores smaller than the average and these may surround the larger pores or in some other manner intercede the path of the fluid undergoing filtration, and (b) as filtered particles accumulate within pores, they reduce the effective diameter of the pores. In the case of bacterial filtration, 100% efficiency of filtration is needed. Even in such cases, filters of the present invention having an average pore size slightly larger than the bacteria (about 1 micron) may function satisfactorily although filters may be made by the present process having pores of 0.5 micron for this purpose.

The flow rate through a filter is a function of pressure drop, pore size and configuration, pore volume per unit weight, viscosity, filter thickness and surface area. It is generally sought to obtain the best flow rate at a given value of pore size or filtration effectiveness. It has been found that the novel configuration and size distribution of the pores of the filter structure of this invention and the large pore volume afford a high flow rate under comparable condition than filters known to the art, especially those made of microporous porcelain. For example, with water at 70° F. and a pressure gradient of 5 p.s.i. a filter of this invention having an average pore size of 2 microns will pass more than 400 gallons per hour per square foot of filtration surface. This rate is about 20% greater than that for a 2 micron porcelain filter.

Within the pore range of 1 to 30 microns as indicated previously, various types of shaped filters may be designed for specifically desired purposes. Thus, when a filter is desired to remove particles of greater than 0.5 micron size such as sand, grit or pigment particles, the shaped filter is ordinarily designed to have pores below the size of the particles to be removed. Obviously if the filter is to be used to remove bacteria, the average pore size must uniformly be not more than 0.5 micron. Such a filter could be prepared by extensive shearing or milling of the dispersion and/or utilizing a sequence of sintering steps.

Where a solid shaped cigarette filter is desired for effectively removing particulate matter from cigarette smoke, the average pore size of such an article should range from 5 to 20 microns in diameter and the article may be designed within the parameters of the process to produce such a filter element.

The shaped microporous product of the present invention may have certain fillers incorporated in the dispersion with the synthetic resin. Such fillers may include finely divided clays or finely divided activated charcoal.

Any fillers which may be incorporated into the sinterable dispersion would be for the purpose of either imparting some specific effect such as bactericidal activity or slow odorant release, or to modify the process or properties of the structure such as to speed sintering or create large voids, or to reduce the cost of the product by use of inexpensive clays, for example. A particularly preferred filler is sub-micron sized positively charged particles such as "Alon" aluminum aerogel, a product of the Cabot Corporation. This filler may be added in an amount of 0.2 to 2.0% by weight of the vinyl chloride resin. The resulting product is particularly useful for the removal of negatively charged particles. Most naturally occurring colloidally dispersed particles (e.g. clay or mud in river or effluent water) are negatively charged. Electrically conductive graphite is also of interest as a filler. The filler, when employed, usually will be present in an amount from about 2% to about 15% by weight of the dispersion. In general, the maximum of an inert, non-sinterable additive under the temperature conditions employed is about 40% by weight of the vinyl chloride resin. Larger amounts lead to inadequate strength of the sintered structure.

In addition to the use of fillers, it may be desired to improve the strength or rigidity of the shaped product. To this end, one may add to the vinyl resin dispersion a polymeric powder such as polyethylene or polyvinyl acetate or a polymerizable monomer, these substances acting as a binder when subjected to the heating step. Such binder substances should not exceed 15% of the weight of the vinyl resin since higher amounts might tend to decrease porosity.

As another embodiment of the invention, one may impart high rigidity to a part or to the entire already formed structure by applying a catalyst and a polymerizable monomer to the surface of the structure and then causing polymerization to occur either by standing at room temperature, or elevated temperature or employing ionizing radiation or other methods to induce polymerization. Such a monomer may be a vinyl or acrylic compound, for example, styrene, methacrylic acid, alpha-octene or diacetone acrylamide which is applied with a known catalyzer such as potassium persulfate or benzoyl peroxide. When the structure is then heated to about 100° to 180° C., the catalyzed monomer impregnates a portion of the structure and in situ hardening will take place.

Other additives may be incorporated in the microporous structure to obtain special effects. These may include, for example, bacteriostats, pigments, metals, magnetic powders, special catalysts, ion exchange resins, and stabilizers.

In a still further embodiment of this invention, the microporous vinyl chloride shaped article and particularly a portion thereof, may be made somewhat soft and flexible or rubbery to a desired degree. This is only done after sintering. The dried product or localized portion thereof may be treated with a suitable plasticizer and heated to about 100° C. to 180° C. so as to impregnate the structure with the plasticizer. In this way the difficulties encountered in and the undesirable effects resulting from attempts to alter the physical characteristics of the microporous structure by initially incorporating a plasticizer in the dispersion, i.e., causing either complete softening of the structure or non-uniformity during the sintering step, is avoided. The usual plasticizers for the vinyl chloride polymers may be employed for this purpose.

The plasticizer, when employed after the sintering step, will usually be used in an amount within the range from about 2 to about 20% by weight of the formed product.

By the use of a plasticizer in the manner described here, the post-sintering addition of plasticizer is advantageous in permitting one to add plasticizer only in particular areas of the formed structure and thereby produce a product with relatively hard and soft regions.

The following examples are illustrative.

EXAMPLE 1

A dispersion was made consisting of 20 parts by weight of a vinyl chloride dibutyl maleate copolymer powder of 1 micron average discrete particle size (a copolymer of 85% vinyl chloride and 15% of dibutyl maleate, said copolymer being sold under the trade name "Pliovic" AO-1 by Goodyear Chemical Co.) and 80 parts by weight ethylene glycol, employing a Waring Blender operating at 15,000 r.p.m. for two minutes. The resultant dispersion was placed in a vacuum chamber and subjected to deaeration by reducing the pressure in the vessel to 0.5 mm. of mercury and the pressure was maintained at 0.5 mm. of mercury at room temperature for about one hour at which time emanation of volatiles (as evidenced by bubbling) had ceased.

A mold was provided consisting of an outer cylindrical glass tube having a rounded bottom and an inside diameter of 34 mm. and an inner aluminum core. The aluminum core was essentially cylindrical, but was tapered downwards from a diameter of 20 mm. to 15 mm. in 250 mm., and was rounded at the bottom. The aluminum core was concentrically positioned within the glass tube, providing an annular space of about 7 mm.

The deaerated dispersion, at room temperature, was poured into the annular space in the mold, and the mold containing the dispersion was placed in an air circulating oven and was maintained therein at a temperature of 160° C. for 52 minutes. During this heat treatment, the dispersion formed a sintered, porous thimble structure which contracted somewhat and adhered somewhat to the core. The thimble was removed and washed with water to remove the ethylene glycol.

The washed thimble, having 18 mm. inside diameter, 30 mm. outside diameter, and 158 mm. length was tested for filtration flow rate by applying a partial vacuum (22 mm. Hg) through a stopper placed inside the thimble and connected via tubing to a collection flask. It was found that the thimble would filter clear water at a rate of 100 cc. per minute. By attempting filtrations of water containing dispersed particles of known size, it was ascertained that the thimble had an effective pore diameter of 2 microns. This thimble may be employed with a supporting grid to remove undesirable material such as rust particles and algae in water recirculated to a cooling tower.

EXAMPLE 2

A mixture consisting of ten parts of polyethylene powder of 5 microns average diameter particle size (sold as "Microthene" FN–500 by U.S.I. Chemicals Co.), 90 parts of vinyl chloride maleic ester copolymer powder of 2 microns average diameter particle size (sold as "Pliovic" AO–1 by Goodyear Chemical Co.), and 400 parts of ethylene glycol was ball milled for 18 hours to form a dispersion. The resultant dispersion was subjected to vacuum deaeration at 0.5 mm. Hg, in the same manner as in Example 1, to remove volatiles.

The dispersion was then employed in a molding operation similar to that described in Example 1. The resultant thimble was found to have greater strength than the thimble made as described in Example 1. The average pore size determined by porosimeter analysis was 3 microns. However, in actual filtration studies of clay particles dispersed in water, the filter effectively removed particles of 1 micron size. This thimble is useful as an attachment to a water faucet which delivers potable water.

EXAMPLE 3

A dispersion was made consisting of 18 parts vinyl chloride-maleic ester copolymer powder of 2 microns diameter particle size (sold as "Pliovic" AO–1), 2 parts of polyvinyl acetate powder of 2–6 microns size (sold as "Vinac" by Airco Chemicals & Plastic Co.) and 80 parts of ethylene glycol, employing a Waring Blender operating at 15,000 r.p.m. for two minutes. The resultant dispersion was subjected to vacuum deaeration at 0.5 mm. Hg in the same manner as in Example 1, to remove volatiles.

Following deaeration, the dispersion was placed in a mold similar to the one described in Example 1, except that the annular space in the mold was 5 mm. instead of 7 mm. The aluminum core and the dispersion were warmed to 60° C. prior to assembling and filling the mold. The heat sintering treatment was the same as in Example 1.

The resultant thimble was highly porous, and had a very small effective pore size. As a result of the use of the "Vinac" the thimble had a smoother inner and outer surface.

EXAMPLE 4

A mixture consisting of 112.5 parts of vinnyl chloride-maleic ester powder of 2 microns diameter particle size (sold as "Pliovic" AO–1), 12.5 parts of polyethylene powder of 5 microns diameter particle size (sold as "Microthene" FN–500), and 375 parts of ethylene glycol was ball milled for 18 hours in a porcelain mill, and the resultant dispersion was deaerated at about 0.5 mm. Hg pressure as in Example 1.

The deaerated dispersion was then placed in a thimble-shaped mold consisting of a 20 mm. diameter inner core concentrically inserted to a depth of 230 mm. within a glass tube having an inside diameter of 46 mm. The mold containing the dispersion was then placed in an oven at 165° C. for 52 minutes. As a result of the oven treatment, the dispersion formed a sintered, thimble-shaped structure having a size about 20% smaller in each dimension than the original mold, except that the inner diameter was held constant by the core. The thimble was removed from the core, washed with water to remove ethylene glycol, and dried. The dry thimble was submerged with its long axis vertical in a large beaker filled with a silica aerogel having fluid-like flow (sold as "Cab-O-Sil" by Cabot Corporation). The beaker containing the submerged thimble was placed in a stream autoclave at 125.5° C. for one hour. Examination of the cooled thimble revealed that a shrinkage of about 20% was caused by the autoclave treatment. The thimble was equipped with a rubber stopper and tubing connected to a vacuum flask. The thimble was found effective in filtering micron-sized particles such as clays suspended in river water, and demonstrated a flow rate of 245 cc. per minute at a filtration pressure of 22 mm. Hg.

EXAMPLE 5

About 10 cc. of the dispersion prepared in Example 4 was poured into a petri dish, covered, and placed in an oven at 165° C. for 52 minutes. A thin porous sheet was thereby formed, having a thickness of about 0.3 mm. The sheet was washed with water, dried, and autoclaved at 125.5° C. for one hour. A 47 mm. diameter disc was cut from the sheet. The disc was placed in Millipore filter holder mounted on a vacuum flask and tested in the filtration of various aqueous dispersions. The disc was found to remove particles as small as one micron.

EXAMPLE 6

A dispersion consisting of 20 parts of vinyl chloride-maleic ester copolymer powder (sold as "Pliovic" AO–1) and 80 parts propane-1,2-diol, was made on a Waring Blender operating at 15,000 r.p.m. for two minutes. The dispersion was deaerated at a pressure of 0.5 mm. Hg as in Example 1. The deaerated dispersion was poured into the mold employed in Example 4. The dispersion-filled mold was placed in an oven at 165° C. for 52 minutes. The resultant molded microporous thimble was washed with water to remove the propanediol from the interstices, and dried. The dry thimble was immersed in a beaker of "Cab-O-Sil" and placed in a steam autoclave at 125.5° C. for one hour. The average pore size, determined by porosimeter analysis was 1.5 microns. The thimble was found to have the ability to remove micron-sized particles from aqueous dispersions and exhibited a flow rate of 370 cc. of water per minute when tested at a pressure drop across the thimble wall of 22 mm. Hg.

EXAMPLE 7

A dispersion was made consisting of 10 parts by weight of a vinyl chloride dibutyl maleate copolymer of 2 micron average particle size and 90 parts by weight of glycerine, employing a Waring Blender operated at 15,000 r.p.m. for 4 minutes. The resultant dispersion was placed in a vaccum chamber and subjected to deaeration by reducing the pressure in the vessel to 0.5 mm. of mercury for about an hour at which time evacuation of volatiles (as evidenced by bubbling) had ceased.

A mold was provided consisting of an outer conical Teflon tube having an inside diameter at the top of 12 mm., and tapering to a pointed bottom over a length of 23 mm., and a matching conical Teflon insert spaced 3 mm. from the outer tube at all points. The deaerated dispersion, at room temperature, was poured into the annular space in the mold, and the mold containing the dispersion was placed in an air circulating oven and was maintained therein at a temperature of 160° C. for 50 minutes. During this heat treatment, the dispersion formed a sintered porous cone which contracted about 35% and adhered lightly to the core. The cone was washed with water to remove the glycerine, and then dried at 40° C.

The washed, dried cone was 15 mm. long from base to apex, and measured 8 mm. across the open base. The wall thickness was approximately 2 mm. Porosimeter analysis revealed an average pore size of $15\mu$, with about 60% of the total pore volume of about 4 cc./gram residing in pores of 12 to $18\mu$ size. The cone was tested as a cigarette filter by inserting it, apex down, into a stiff paper tube extending from the end of a cigarette rod of 85 mm. length. The resistance to draw (RTD) of the filter cone alone was found to have an acceptable value of 2.5 inches of water, providing an overall cigarette and filter RTD of 5 inches of water. The RTD is defined as follows:

A vacuum system is set to puff an air flow of 1050 cc./min. by inserting the tapered end of a standard capillary tube through the dental dam of a cigarette holder and adjusting the reading on an inclined water manometer to the correct RTD. The water level of the manometer is set at zero before inserting the standard capillary tube.

Then, the butt end of a cigarette or plug is inserted to a depth of 5 mm. in the dental dam of the cigarette holder. The pressure drop behind this cigarette with 1050 cc./min. of air flow passing through is read directly at RTD (inches water) from the inclined water manometer.

The cigarette equipped with the conical filter was tested for the percent efficiency of removal of total particulate matter (TPM). It was found that 84% of the TPM was removed. Examination of the filter after smoking revealed that all the smoke passed through the conical filter. There was no by-pass or avoidance of the filter. None of the smoke appeared to have gone around the perimeter of the base of the cone where it contacts the paper tube.

By way of comparison, an identical cigarette, provided with a fibrous acetate fiber rod filter of 48,000 total denier with individual filter denier of 4, and having an RTD of 2.5 inches, gave only 35% TPM reduction.

EXAMPLE 8

The deaerated dispersion of Example 7 was employed to impregnate a light weight fiber glass filter mat of the type commonly employed as filters for forced air heating systems. The impregnated mat was sandwiched between Teflon plates and placed in an air circulating oven at 160° C. for 50 minutes to produce a sintered slab composite structure reinforced by virtue of the fiber glass. Water was drawn through the slab to remove the glycerine, and the washed slab was dried by drawing air at 40° C. through it.

The dry slab thickness was ¼". Porosimeter analysis indicated an average pore diameter of $22\mu$, with about 55% of the total pore volume of about 5 cc./gm. residing in pores of 18 to $26\mu$. The slab was tested for acoustic absorption in accordance with the ASTM "Standard Method of Test for Impedance and Absorption of Acoustic Materials." Sound absorption coefficients were determined at frequencies of 250, 500, 1000 and 2000 Hz. These were then averaged to obtain a noise reduction coefficient of 0.52. By way of comparison, a commercially available acoustic tile made of fissured cellulose, when tested in identical manner, provided a noise reduction coefficient of only 0.48.

We claim:

1. A process for preparing a microporous polymer product comprising dispersing a dry powder of finely divided vinyl chloride polymer resin containing polymer aggregates in a carrier liquid that is a water-soluble, organic non-solvent for the polymer, subjecting the polymer dispersion to a low pressure deaeration step until substantially all air is removed and then heating the deaerated dispersion to a temperature of about 125° to 190° C. until the polymer particles fuse together into a microporous solid shaped product and then removing the non-solvent from the product.

2. The process of claim 1, wherein the deaeration step is carried out at a pressure below 10 mm. of mercury.

3. The process of claim 1, wherein the non-solvent comprises a polyhydric alcohol of the formula $R(OH)_x$ where R is a multivalent alkyl or alkyl ether radical of 2–8 carbons and $x$ is 2, 3 or 4, said alcohol is water-soluble and has a boiling point greater than 160° C.

4. The process of claim 3, wherein the non-solvent is selected from the group consisting of a low molecular weight glycol of 2 to 6 carbon atoms, glycerine and mixtures thereof.

5. The process of claim 3, wherein the effect of the polyhydric alcohol on the settling rate of the vinyl chloride resin dispersed in the polyhydric alcohol is represented by the formula:

$$\frac{1.40-P_1}{M}$$

and has a value below 2.0.

6. The process of claim 3, wherein the non-solvent has a surface tension greater than 40 dynes per cm.

7. The process of claim 1, wherein the polymer is a polyvinyl chloride.

8. The process of claim 1, wherein the polymer is a copolymer of vinyl chloride and a lower alkyl maleate.

9. The process of claim 1, wherein the resin has a particle size average diameter of about 1–10 microns and is present in an amount of about 10–30% by weight of the dispersion.

10. The process of claim 1, wherein a polymeric binding agent is combined with the vinyl chloride polymer resin in an amount of about 1% to 15% by weight prior to the deaeration and heating step.

11. The process of claim 1, wherein an inert filler is combined with the polymeric resin in an amount below about 40% by weight based on said polymeric resin component.

12. The process of claim 1, wherein the sintered polymer is formed into a shaped structure and is subjected to post-sintering at a temperature of from about 70° to about 120° C. while being supported in a bed of inert finely divided solids thereby increasing the rigidity and density of the structure and reducing its pore diameter.

13. The process of claim 1, wherein, after sintering, the dried product is rendered soft and flexible in specific regions by contacting such regions with a plasticizer and heating it to about 100° C.–180° C. to impregnate the structure with the plasticizer.

14. The process of claim 1, wherein, after sintering, the dried product is rendered more rigid and inflexible by impregnating the same with a catalyzed vinyl or acrylic monomer and effecting in situ polymerization.

15. The process of claim 1, wherein, preparatory to dispersing said vinyl chloride resin in said carrier, an aqueous dispersion of discrete particles of finely divided vinyl chloride resin is dried to produce said polymer aggregates.

16. The process of claim 15, wherein said dispersion of resin is dried by spray drying.

References Cited

UNITED STATES PATENTS

| | | | |
|---|---|---|---|
| 3,674,722 | 7/1972 | Raines et al. | 260—2.5 M |
| 3,576,686 | 4/1971 | Schmidle | 260—2.5 M |
| 3,297,595 | 1/1967 | Mindick et al. | 260—2.5 M |

FOREIGN PATENTS 211,017  10/1957  Australia ———— 260—2.5 M

WILBERT J. BRIGGS, SR., Primary Examiner

U.S. Cl. X.R.

131—269; 260—2.5 P, HA, 31.8 R, 41 A, 33.4 R, 884, 897, 899, 901, 92.8 A; 264—48, 49, 109